United States Patent [19]

Barby et al.

[11] Patent Number: 4,797,310
[45] Date of Patent: Jan. 10, 1989

[54] SUBSTRATE CARRYING A POROUS POLYMERIC MATERIAL

[75] Inventors: Donald Barby, Chester; Zia Haq, Merseyside, both of England

[73] Assignee: Lever Brothers Company, New York, N.Y.

[21] Appl. No.: 391,046

[22] Filed: Jun. 22, 1982

[30] Foreign Application Priority Data

Jun. 26, 1981 [GB] United Kingdom ............... 8119739

[51] Int. Cl.⁴ .............................................. C08J 9/28
[52] U.S. Cl. ...................................... 428/71; 428/76; 428/316.6
[58] Field of Search .................. 428/76, 71, 316.6; 401/196, 200; 239/211

[56] References Cited

U.S. PATENT DOCUMENTS

| | | | |
|---|---|---|---|
| 3,284,273 | 11/1966 | Prentice | 428/76 |
| 3,334,374 | 8/1967 | Watkins, Jr. | 401/200 |
| 3,720,534 | 3/1973 | Macaulay | |
| 3,732,652 | 5/1973 | Fungal et al. | 401/196 X |
| 4,226,886 | 10/1980 | Lahes | 428/316.6 X |
| 4,254,179 | 3/1981 | Caison III, et al. | 428/316.6 |
| 4,340,057 | 7/1982 | Bloch et al. | |
| 4,473,611 | 9/1984 | Haq | 428/286 X |

FOREIGN PATENT DOCUMENTS

| | | |
|---|---|---|
| 3200671 | 7/1980 | Australia . |
| 1304375 | 1/1973 | United Kingdom . |
| 1513939 | 6/1978 | United Kingdom . |
| 952075 | 10/1980 | United Kingdom . |
| 1576228 | 10/1980 | United Kingdom . |

Primary Examiner—Nancy A. B. Swisher
Attorney, Agent, or Firm—Milton L. Honig; James J. Farrell

[57] ABSTRACT

An article suitable for delivering or absorbing liquid includes a substrate carrying a pressure-sensitive porous polymeric material which is capable of retaining at least 10 times its own weight of water or corresponding amounts of other liquids. The porous polymeric material is advantageously a crosslinked homogeneous block material having a dry density of less than 0.1 g/cc and a pore volume of more than 9 cc/g, and may be produced by polymerization of a high internal phase emulsion. In the article of the invention, the polymer may either be dry or contain an included liquid; the dry form is highly absorbent and is useful for mopping up slippages, while the liquid-containing form is useful for delivering treatment liquids, for example, cleaning compositions, to surfaces. The article may take the form of a single- or multi-compartment sachet of paper or nonwoven fabric containing the porous polymeric material.

17 Claims, 2 Drawing Sheets

SUBSTRATE CARRYING A POROUS POLYMERIC MATERIAL

The present invention relates to an article for wiping a surface, for example, the surface of a household or industrial object, or the human skin, in order either to deliver a liquid active material to that surface or to pick up liquid from that surface; or for gradually releasing an active material, such as a bubble bath composition, an air-freshener or a perfume, without surface contact. The article includes a substrate which in one embodiment of the invention carries a liquid active material, for example, a detergent, or a skin treatment material.

Various wet tissues and towelettes are available in the market for various purposes for example, for personal cleansing or baby hygiene. Artcles of this type have to have quite a high liquid content if they are to give adequate cleansing, and thid means that moistrueproof packaging is essential. One approach to this problem is to package the articles individually in moistureproof sachets, as is done, for example, with the moist towelettes provided by airlines. This is, however an expensive solution. More recently thers have appeared on the retain market packs of wet tissues for personal cleansing in which a roll of moist tissue perforated at suitable intervals is contained in a moisture tight container with a tight closure through which tissues can be drawn out and torn off. These containers are generally of fairly elaborate design and are expensive to produce.

The need for moistureproof packaging can be obviated if the liquid is carried on the substrate in a protected form so that the overall article is dry up to the point of use. One method of protecting the liquid is to encapsulate it in microcapsules which can be incorporated into or coated onto a substrate and which can be ruptured by the application of pressure, as described, for example, in GB No. 1 304 375 (L'Oréal).

We have now discovered a convenient alternative method by means of which a substrate article may be produced which has a high liquid content yet which may be dry up to the point of use. This is achieved by including the liquid in a porous polymeric material from which it can be released only by the application of pressure. Furthermore, a substrate carrying such a porous polymeric material in the dry state, that is to say, without an included liquid, can be useful as an absorbent wiper for mopping up spilt liquids.

Accordingly, the present invention provides an article suitable for delivering or absorbing a liquid, the article comprising a substrate carrying a pressure-sensitive porous polymeric material capable of retaining at least 5 times, and preferably at least 10 times, its own weight, defined in terms of water, of liquid, and of releasing at least some of that liquid on the application thereto of hand pressure, the porous polymeric material being dry or containing an aqueous or non-aqueous liquid.

The present invention thus has two main aspects within this generic concept. The first is an article suitable for absorbing liquid, for example from a surface, said article comprising a substrate carrying a dry porous polymeric material capable of absorbing and retaining at least 10 times its own weight, defined in terms of water, of liquid.

This article according to the invention has an exceptionally high absorbency for liquids and is thus useful for mopping up liquid spillages.

The second aspect of the invention is an article suitable for delivering a liquid active material, said article comprising a substrate carrying a porous polymeric material capable of retaining at least 10 times its own weight of liquid, defined in terms of water, and of releasing at least some of that liquid on the application thereto of hand pressure, the porous polymeric material containing an active liquid material.

The term "active liquid material" is used to indicate a liquid that can usefully and beneficially be delivered by the article of the invention.

The polymer/liquid composite included in the article of the invention (in its second aspect) preferably consists to an extent of at least 90%, more preferably at least 95%, by weight, of liquid.

The polymer is such that the liquid contained in it remains enclosed within the polymer unless expressed by the application of hand pressure; the liquid-containing polymer can consist of up to 98% by weight of liquid while feeling virtually dry to the touch. Thus an article containing a high proportion by weight of entrapped liquid can be produced. The liquid can be hydrophobic or hydrophilic depending only on the intended use. Articles of this general type may be used for many purposes, for example, hand and face cleaning; skin treatment other than cleaning (for example anti-acne treatment); baby hygiene; cleaning, polishing, disinfecting or deodorising industrial and domestic surfaces (for example, windows, paintwork, machinery, carpets, clothing, shoes); air freshening and perfume delivery; and hospital hygiene.

The article can remain dry during handling and storage, until the liquid in the polymer is released at the point of use by the application of pressure. It is also within the scope of the invention for the article to be wet, for example, impregnated, either with the liquid contained in the polymer or with a different liquid. If a second liquid is present, this may not necessarily be compatible with the first, since mixing will not occur until the polymer is squeezed in use. As mentioned in more detail below, an article of the invention may include a plurality of separate regions of polymeric material containing the same or different liquids, and any additional liquid present outside the polymer may be the same or different from any of the polymer-included liquids.

One or more further liquids may if desired be present in microencapsulated form. This is especially advantageous in the case of mutually incompatible liquids.

Preferably the porous polymeric material is capable of retaining at least 15 times, more preferably at least 25 times, and especially at least 40 times, its own weight of liquid, defined in terms of water. It will not necessarily be capable of absorbing these quantities of all types of liquid spontaneously; in some cases suction may be necessary to assist the introduction of liquid. It is, however, essential that once the liquid is inside the pore system of the polymer it remains there unless the polymer is squeezed, apart of course from the unavoidable slow loss of liquid by evaporation.

It is thus essential that the porous polymeric material combines a high capacity for liquid with an ability to retain the liquid unless subjected to pressure. There must be little or no tendency for the liquid to run out of the polymer under the influence of gravity; the liquid should remain distributed throughout the material until expressed by pressing or squeezing the material at hand pressure. After the liquid has been expressed, the material may not regain its original shape or pore structure.

This combination of properties may be found in a material having relatively large voids interconnected only by relatively narrow passageways. On squeezing there is a partial collapse of the structure allowing escape of the liquid.

The polymer preferably has a pore volume greater than 9 cc/g, more preferably greater than 15 cc/g.

The dry density of the polymer is preferably less than 0.1 g/cc, more preferably within the range of from 0.03 to 0.08 g/cc. This is the density of the material when its pore system contains air. Some polymers that can be used in the article of the invention, however, cannot exist in the dry state; they are prepared by methods which leave the pore system full of liquid, and this liquid can if desired be exchanged for another liquid, but if dried their pore system collapses. Such materials are useful in the second aspect of the invention although inherently unsuitable for use in the first aspect of the invention.

Various polymers suitable for use in the present invention have been described in the literature. Techniques for the production of porous polymers range from what is termed, in the art, classical phase inversion, to nuclear bombardment, the incorporation of microporous solid particles in a matrix material followed by the leaching out of the particles, and the sintering together of microporous particles.

The porous polymeric material used in the article of the invention may if desired be in the form of beads, either discrete or coalesced. Such porous polymer beads are disclosed, for example, in GB No. 1 513 939 (Ceskoslovenska Akademie Ved); they are prepared by dissolving the polymer to be used in a solvent and then dispersing the solution into a compatible carrier liquid, and adding this mixture to a coagulating liquid such as water to precipitate the porous beads of polymer. If desired, the beads may be subsequently coalesced to form a moulding.

Preferably, however, the porous polymeric material that forms part of the article of the invention is, at least initially, in the form of homogeneous block or sheet material. Such material has the advantage that it will be substantially homogeneous or uniform in its porosity, and will then deliver or absorb liquid in a uniform and predictable manner. The polymeric material in block or sheet form may of course be cut down into smaller pieces, or even ground into powder, before use. In the case of a liquid-containing polymer, this will entail some loss of liquid but this can generally be tolerated.

One homogeneous porous polymeric material suitable for use in the article of the invention is described and claimed in GB No. 1 576 228 (Akzo). This patent specification discloses thermoplastic microporous cellular structures comprising microcells (pores) having an average diameter of 0.5–100 μm connected by smaller-diameter passageways, the size drstribution of the latter being a defined function of the average cell diameter. The structures are composed of a synthetic thermoplastic homopolymer or copolymer of an ethylenically unsaturated monomer, or of a condensation polymer, or of a polyphenylene oxide, or of any blend of these. The structures are prepared by dissolving the thermoplastic polymer in a suitable solvent at elevated termperature, cooling the solution to solidify the polymer, and then removing the liquid from the resulting solid structure. These materials generally have void volumes of 70–80%, and can retain about 5 times their own weight of liqiid (defined in terms of water). The Akzo process is of course limited in its application to thermoplastic polymers, and to polymers that can readily be dissolved in appropriate solvents, but within these limits yields materials highly suitable for use in the article of the invention.

An alternative route to porous polymeric materials having the requisite pore and passageway structure involves solution or emulsion polymerisation of an organic film- c forming polymer under controlled conditions. In particular, according to a highly preferred embodiment of the invention, the polymer may be prepared by polymerisation of a high internal phase emulsion in which the internal phase is aqueous and the continuous phase comprises one or more polymerisable monomers. This method can give polymers capable of retaining at least 10 times their own weight of liquid (defined in terms of water).

The higher the proportion of the aqueous internal phase in the starting emulsion, the higher will be the void volume in the final polymer. Thus the aqueous phase preferably constitutes at least 90%, more preferably at least 95%, by weight of the emulsion.

It has been observed from microscopic inspection of samples of the porous polymer made by this method that it essentially comprises a series of substantially spherical, thin-walled cavities having a plurality of very small holes in the walls interconnecting the adjacent cavities. Frequently six or more holes can be seen in the cavities on inspection of electron micrographs of polymer samples. It has been determined that the liquid absorbency and retention capacity is related to the size of the cavities, expressed in terms of void diameter, and the number and size of the holes in the cavity walls, expressed in terms of pinholes. In general it is desirable that the average pinhole diameter should not be less than 0.5 μm and the void diameter should be at least 20% greater than that figure.

The polymeric material is advantageously crosslinked. Crosslinking apparently improves the capacity for absorption and retention of liquids and also gives greater dimensional stability.

In the high internal phase emulsion, the continuous phase comprises the monomer(s), and a surfactant (as emulsifier) and a polymerisation catalyst are also present. Preferably the amount of surfactant present is from 5 to 30% by weight, based on the total monomer, and the amount of catalyst present is from 0.005 to 10% by weight, based on the total monomer.

The mechanism by which the holes form in the thin-walled cavities is not fully understood. However, experimental work suggests that it is related to the quantity of surfactant present and its compatibility with the crosslinked polymer and, hence, also, to the degree of crosslinking in the polymer. It is thought that prior to polymerisation the high internal phase emulsion consists of three main elements monomer and surfactants in the continuous phase and water in the internal phase. The continuous phase, which consists of a homogeneous solution of surfactant and the monomer and cross-linking agent and, in this situation, the surfactant is compatible with the monomer mixture. It is thought that at this stage there are no interconnecting holes present in the external phase. During polymerisation chain propagation takes place and as the surfactant is not polymerisable and has no reactive sites in its structure, it cannot take part in the polymerisation reaction. As a result, the surfactant molecules separate because the surfactant is no longer compatible with the growing polymeric structure and is also insoluble in the water phase. Due to the nature of a surfactant, the aggregated molecules of surfactant remain part of the polymer phase and probably cause the production of weak spots and subsequent pinhole formation in the cross-linked polymer film.

Another factor affecting the structure of the porous cross-linked polymer is the structure of the high internal phase emulsion from which it is formed. This can most readily be defined in concepts of viscosity and Table I and II indicate the effect of stirrer speed on two typical emulsions and show the viscosity of emulsions produced at different stirrer speeds and the detailed structure of the cross-linked porous polymers produced from the emulsions at the different stirring rates.

The basic emulsion used in the work shown in Table I contained 10 ml styrene, 1 ml divinyl benzene and 2 grams of Span (Trade Mark) 80 and 200 ml water containing 0.2% sodium persulphate. The emulsion used for the work in Table II was the same except that 300 ml water were used and in each case the preparation was carried out generally as described in Example I below.

The emulsions were prepared at stirrer speed of 200 rpm and after all the components had been mixed the samples of the emulsion were stirred at the speeds shown in the Tables for 30 minutes prior to cross-linking to yield the porous cross-linked polymer samples.

Viscosity measurements were made used using Brookfield Viscometer fitted with a 'C' spindle at, as shown in the Tables, 10 and 20 rpm.

TABLE I

| Motor Speed (RPM) | Viscosity of emulsion for polymerisation | | | | Structure of cross-linked polymer (average) | |
|---|---|---|---|---|---|---|
| | 10 RPM Viscometer Reading | $\times 10^3$ poise | 20 RPM Viscometer Reading | $\times 10^3$ poise | Sphere size (um) | Interconnecting pore size (um) |
| 200 | 12.3 | 12.3 | 14.5 | 7.3 | 38.4 | 5.3 |
| 300 | 21.8 | 21.8 | 24.5 | 12.3 | 25.1 | 4.1 |
| 500 | 23.2 | 23.2 | 26.5 | 13.3 | 15.4 | 2.8 |
| 800 | 50.8 | 50.8 | 55.0 | 27.5 | 9.1 | 1.6 |
| 1000 | 60.8 | 60.8 | 69.9 | 35.0 | 8.1 | 1.4 |
| 2000 | 100+ | 100+ | | | 7.1 | 1.0 |

TABLE II

| Motor Speed (RPM) | Viscosity of emulsion for polymerisation | | | | Structure of cross-linked polymer (average) | |
|---|---|---|---|---|---|---|
| | 10 RPM Viscometer Reading | $\times 10^3$ poise | 20 RPM Viscometer Reading | $\times 10^3$ poise | Sphere size (um) | Interconnecting pore size (um) |
| 200 | 7.1 | 7.1 | 8.0 | 4.0 | 45.8 | 5.4 |
| 300 | 13.5 | 13.5 | 15.0 | 7.5 | 20.0 | 4.0 |
| 500 | 18.8 | 18.8 | 21.5 | 10.8 | 17.1 | 2.4 |
| 800 | 34.9 | 34.9 | 42.4 | 21.2 | 11.7 | 1.5 |
| 1000 | 39.7 | 39.7 | 46.6 | 23.3 | 8.4 | 1.5 |
| 1500 | 43.4 | 43.4 | 54.1 | 27.1 | 9.0 | 1.3 |
| 2000 | 55.6 | 55.6 | 61.8 | 30.9 | 7.7 | 0.95 |

It will be seen from the tables that the emulsion viscosity has a clear relationship with the pore or cavity size of the cross-linked polymer and with the size of the holes or interconnecting passages between the cavities. Clearly by selecting the appropriate stirrer speed and hence viscosity of the emulsion the size of the cavities in the cross-linked polymer can be quite closely controlled.

In general it will be noted that the ratio of sphere or cavity size to the size of the interconnecting pore or pinhole is of the order of 71.

Various monomers may be used in the preparation of those porous polymers by the emulsion method. Vinyl monomers are preferably used, styrene being especially preferred. If the polymer is to be lightly cross-linked, a cross-linking monomer is included in the starting emulsion. A preferred polymer is a lightly cross-linked polystyrene containing a small proportion of divinylbenzene. Polymeric materials may also be made using various acrylate polymers, for example, polymethyl or polybutyl methacrylate, cross-linked with, for example, allyl methacrylate.

Preferably, the polymerisation catalyst is in the water Phase and polymerisation occurs after transfer of the catalyst into the oil phase. Alternatively, the polymerisation catalyst may be introduced directly into the oil phase. Suitable water-soluble catalysts include potassium persulphate and various redox systems such as ammonium persulphate together with sodium metabisulphite. Monomer soluble catalysts include azodibisisobutyronitrile (AIBN), benzoyl peroxide and di-2-ethyl-hexyl-peroxydicarbonate. The temperature at which the polymerisation is carried out can be varied fairly widely between about 30° and 90° C., but is clearly related to the particular catalyst initiator employed.

The surfactant used in making the high internal phase emulsion which is to be polymerised is fairly critical, although the long-term stability of the high internal phase emulsion is not an important factor provided that it is long enough to maintain stability during polymerisation. Using the well known HLB terminology in relation to the surfactants, it is desirable that the surfactant has an HLB value of less than 6 and more than 2, preferably about 4. Providing the HLB criterion is met, many surfactants can be used in the preparation of the porous polymers. Amongst those suitable may be included:

| | HLB |
|---|---|
| Nonionic | |
| Sorbitan monoleate ("Span"(Trade Mark) 80) | 4.3 |
| Glycerol monoleate | 3.8 |
| Glycerol monoricinoleate | ˜4.0 |
| PEG 200 dioleate | 4.6 |
| Partial fatty acid esters of polyglycerol (Admul (Trade Mark) Wol 1403 ex Food Industries Limited of Bromborough, England) | |
| Castor oil 5–10 EO | 3–6 |
| Cationic | |
| Distearyl dimethyl ammonium chloride | ˜5–6 |
| Dioleyl dimethyl ammonium chloride | ˜5–6 |
| Anionic | |
| Bis-tridecyl sulphosuccinic acid (Na salt) | ˜5–6 |
| Amphoteric | |
| Alkylbenzene sulphonate/$C_{18}$ amine oxide complex | |

Experimental work has shown that the amount of surfactant in the system is critical and htat if insufficient surfactant is employed the cavities have insufficient holes to generate the desired absorbency. the optimum concentration of surfactant by weight of monomers is of the order of 20%, but useful results can be obtained in the range of 5 to 30% and preferably, 15–25%.

The polymers used in the article of the invention may be prepared by first forming a water-in-oil high internal phase emulsion system where the oil phase is constituted by the monomer or mixture of monomers, together with a small amount of a cross-linking agent. The polymerisation initiator or catalyst can be dissolved in either the water phase or in the oil (monomer) phase. The high internal phase emulsion system is prepared by the slow addition of the aqueous internal phase to the oil (monomer) phase in which the emulsifying agent (surfactant) is preferably dissolved, using a moderate shear stirring. Conveniently the container in which the polymerisation is carried out is enclosed to minimise the loss of volatile monomers and the emulsions are thermally polymerised in the container.

This process gives a polymer in which the void system contains an aqueous liquid—the internal phase of the original emulsion. If desired, this liquid can be readily removed by subjecting the polymer to a vacuum or leaving the material to dry in a dry atmosphere at between about 30° and 60° C. The dry polymer thus obtained may be used to form a dry article according to the first aspect of the invention, which as indicated previously, is very useful for mopping up spillages of hydrophobic liquids. One polymer which is described and claimed in British Patent Application No. 81 07658 and European Patent Application No. 82301199.4, the disclosures of which are hereby incorporated by reference, is exceptionally useful for absorbing hydrophobic liquids and has an absorbency for such liquids, defined in terms of oleic acid, of at least 7 cc/g.

In articles according to the second aspect of the invention, the void system of the polymer contains a liquid. Starting from a high internal phase emulsion, the liquid-containing polymer may be prepared in three ways:

(a) a dry polymer may be prepared as described above, and the desired liquid subsequently introduced;

(b) the liquid initially present in the polymerised high internal phase emulsion may be exchanged for the desired liquid;

(c) the desired liquid may itself be used as the internal phase of the emulsion.

When method (a) is used, the polymer may spontaneously take up the desired liquid if the polymer is of a type which has a high absorbency for the liquid in question. Otherwise, introduction of the liquid may be vacuum-assisted.

Method (b) is a direct substitution of the desired liquid for the original internal phase of the emulsion without an intermediate drying step. The polymer is preferably washed before the introduction of the desired liquid, in order to remove traces of the materials present in the original internal phase, notably the surfactant. Washing with a solvent such as a lower alcohol is highly effective. Where the desired liquid is a detergent composition, the desired liquid may itself be used for the preliminary washing step, although it may then be necessary to wash at a higher than ambient temperature, for example, 50° C. Liquid exchange may be carried out as a continuous, vacuum-assisted operation.

Method (c) is of course suitable only for certain aqueous liquids that will not destabilise the high internal phase emulsion. In particular, it is not suitable for liquids containing high-HLB surfactants, as do most detergent compositions. One class of liquids that is suitable for inclusion by method (c) is comprised of aqueous solutions of oxygen bleaches, especially hydrogen peroxide-based bleaches.

In the article of the invention the polymer is carried by a substrate. The substrate may be any suitable carrier material that gives integrity to, and provides protection for, the polymer. For convenience of handling, it advantageously comprises one or more layers of flexible sheet material, or a sponge or pad. The substrate is advantageously porous to allow liquid to pass through, and may advantageously.be absorbent. In the first aspect of the invention an absorbent substrate adds to the overall absorbency of the article; and in the second aspect of the invention an absorbent substrate will become impregnated with the liquid as the latter is expessed from the polymer and can assist in its distribution, for example, on a hard surface being wiped. Alternatively, as previously mentioned, an absorbent substrate may be impregnated with further liquid which may be the same as, or different from, that included in the polymer. A preferred substrate according to the invention includes one or more sheets of fibrous material, especially wet-strength paper or woven, knitted or nonwoven fabric.

According to a preferred embodiment of the invention (in both aspects) the polymer is completely surrounded by the substrate. Thus the polymer, in the form of beads or a solid block, sheet or film, may be inside a sachet. At least one wall of the sachet must be permeable to liquid in order to allow the passage of liquid into or out of the polymer; thus at least one wall is of inherently permeable material and/or contains openings.

Advantageously the sachet walls (substrate) may be formed of a nonwoven fabric/plastic film laminate, at least one of the walls being provided with one or more perforations to allow the passage of liquid.

Advantageously the article of the invention may consist of a plurality of cells or compartments each of which is in effect a sachet as described above. This type of article may comprise a first substrate layer and a second substrate layer so bonded together as to create a plurality of compartments therebetween, at least some of said compartments containing the porous polymer and at least some of said compartments being liquid-permeable.

Advantageously, at least some of the compartments are provided with one or more perforations.

In use, the polymer itself remains within the compartments but liquid can pass out of or into it through the substrate walls or by way of the perforations.

Advantageously different compartments of the article are provided with different numbers of perforations to allow differing rates of passage of liquid. This is especially advantageous in the case of articles according to the second aspect of the invention, in that it allows for controlled release of the liquid over a relatively long period. This embodiment also allows for the use of polymers containing different liquids in different compartments for release at different rates.

Advantageously the substrate layers include heat-sealable material. The two layers can then be bonded together by welding, for example, by heat sealing or ultrasonic sealing, around the porous polymer. Nonwoven fabric including some thermoplastic fibres, and nonwoven fabric laminated with thermoplastic film, may advantageously be used.

If the porous polymer is in discrete form, such as beads, these may be sprinkled onto the first layer and the second layer subsequently heat-sealed to the first. This process may be carried out continuously, for example, using hot rollers.

The porous polymer may, however, be in continuous (block, sheet or film) form. A block should first be cut into sheets. If the polymer is itself heat-sealable, a sheet or film may be interposed between two layers of substrate laminate and the whole heat-sealed together, in a continuous operation, for example, using hot rollers.

If the porous polymer is not heat-sealable, it may first be cut into compartment-sized pieces, arranged on one substrate layer using a grid-patterned mask to aid positioning, and the second substrate layer then heatsealed to the first between the polymer pieces.

The perforations may be made at any suitable stage in the proceedings. Pre-perforated substrates may if desired be used; this of course requires matching of the perforation pattern to the pattern of bonding between the substrates. Alternatively, the compartments may be perforated after the active material/substrate composite has been made up. In a batch process, perforation may be carried out using a syringe needle.

In a continuous process as mentioned above, the perforations may be made on one or both sides of the article, after the two substrates have been bonded together, by passing the composite article over a roller carrying appropriately spaced pins.

The perforations may be as small as desired, but will generally be at least 0.01 mm in diameter, preferably at least 0.1 mm. Perforations of from 0.2 to 1.2 mm are preferred, especially from 0.5 to 1.0 mm. Of course relatively large perforations are suitable only when the active material is not very mobile or is protected as indicated previously.

The distribution of perforations depends on the size of the compartments as well as on the desired rate of release of the active material. The compartments preferably have areas ranging from 0.5 to 5 $cm^2$, more preferably from 1 to 3 $cm^2$ and especially from 1.5 to 2.5 $cm^2$. The compartments may be of any convenient shape; for ease of manufacture the bonding lines separating them are preferably straight and hence parallelogram shapes, such as square, rectangular, rhomboidal (diamond) and the like, are especially preferred.

The average distribution of perforations is advantageously less than $5/cm^2$, and preferably lies between 0.5 and $3/cm^2$. Practicable rates of release of most liquids can be obtained with average perforation levels within this range. Of course the distribution of perforations among the compartments may be either regular or irregular as desired.

In articles according to the second aspect of the invention, where the polymer contains a liquid, the liquid can be any that will deliver a benefit, as previously indicated; it may be hydrophobic or hydrophilic. Examples of such liquids include soap and detergent compositions, bleach, disinfectant, bubble bath and shower preparations, air fresheners, skin treatment agents, dry cleaning solvents, perfumes, and many more.

In one particular embodiment of the second aspect of the invention, the liquid is a cleaning composition that will give substantially streak-free cleaning of reflective household surfaces such as mirror, tiles, paintwork and furniture.

Such an article has the advantage that it can be applied directly to the surface to be cleaned; the surface need only wiped over and then allowed to dry. No additional liquid and no cloths or tissues are required; thus contamination by streak-forming impurities is eliminated.

In this embodiment the liquid in the void system of the porous polymer is a homogeneous aqueous liquid composition having a surface tension of less than 45 $mNm^{-1}$, preferably less than 35 $mNm^{-1}$, which composition, when applied to a surface and allowed to dry, dries substantially without forming discrete droplets or Particles larger than 0.25 $\mu m$.

The formation of discrete droplets or particles larger than 0.25 $\mu m$ on drying causes scattering of visible light (wavelength 0.4–0.7 $\mu m$), which is perceived by the eye as streaking. Preferably the liquid composition dries substantially without forming discrete droplets or particles larger than 0.1 $\mu m$.

In this embodiment it is essential that both the substrate and the polymer be substantially free of streak-forming impurities which might be leached out by the liquid composition and deposited on the wiped surface as streaks. The porous polymers themselves have been found to give no streaking problems provided that they are thoroughly washed (see previously) before introduction of the streak-free liquid composition.

Some substrates may inherently be free of such impurities; many papers or nonwoven fabrics, however, contain binders and some of these can cause streaking problems. Traces of bonding agent, size, clays, fluorescers, fibre lubricants, emulsifiers or other processing materials may also be present in papers and nonwoven fabrics and these can also cause streaking. Accordingly the substrate is preferably pretreated to remove any materials associated therewith that might cause, or contribute to, streaking. The treatment may conveniently comprise prewashing the substrate with a solvent capable of removing the impurities, before the application of the liquid composition. In some cases washing with hot to boiling demineralised water may be necessary, while in others a pre-soaking in an excess of the liquid composition itself may suffice. Some binders used in paper and nonwoven fabrics, notably crosslinked katpolyalkylimine, do not appear to cause streaking problems, and substrates in which only this type of binder is present may not require a prewashing treatment.

The homogeneous aqueous liquid composition for streak-free cleaning may contain, as well as water, one or more water-miscible solvents, but the amount of non-aqueous solvent generally should not exceed 35% by weight, and is preferably within the range of from 0.1 to 15% by weight. Larger amounts of solvent can cause safety problems and may damage certain surfaces such as plastics or paintwork; the presence of limited amounts of solvent is however advantageous in decreasing the drying time of the composition and in facilitating the removal of oily soil.

Typical examples of suitable solvents are the lower aliphatic water-miscible alcohols such as ethanol, propanol, isopropanol, butanol and so on. Other alcohols, such as tetrahydrofurfurol, may also be used. Glycols such as ethylene- and propylene glycol and glycol ethers, such as the mono- and dimethyl-, -propyl, -isopropyl, -butyl, -isobutyl ethers of di- and triethylene glycol and of analogous propylene glycols may also be used. The preferred solvents are $C_2$ and $C_3$ aliphatic alcohols, especially ethanol and isopropanol. The cellosolves and carbitols are also useful solvents in the context of the invention.

It will be recalled that the liquid composition for streak-free cleaning has a surface tension of less than 45 $mNm^{-1}$, and preferably less than 35 $mNm^{-1}$, in order adequately to wet the surface being wiped. The lowering of surface tension (the value for water is above 70 mNm$^{-1}$) is conveniently achieved by including in the liquid a surface-active agent, preferably at a concentration not exceeding 1.5% by weight. Higher concentrations are unnecessary from the point of view of surface tension lowering and may cause streaking or excessive sudsing. A concentration within the range of from 0.009 to 1% by weight is preferred, and one within the range of from 0.02 to 0.2% by weight is especially preferred.

Although in principle any anionic, nonionic, cationic, zwitterionic or amphoteric surface-active agent may be used, nonionic surface-active agents, which tend to be low-foaming, are especially preferred. In general, nonionic surface-active agents consist of a hydrophobic moiety, such as $C_8$–$C_{20}$ primary or secondary, branched or straight chain monoalcohol, a $C_8$–$C_{18}$ mono- or dialkylphenol, a $C_8$–$C_{20}$ fatty acid amide, and a hydrophilic moiety which consists of alkylene oxide units. These nonionic surface-active agents are for instance alkoxylation products of the above hydrophobic moieties, containing from 2 to 30 moles of alkylene oxide. As alkylene oxides ethylene-, propylene- and butylene oxides and mixtures thereof are used.

Typical examples of such nonionic surfactants are $C_9$–$C_{11}$ primary, straight-chain alcohols condensed with from 5–9 moles of ethylene oxide, $C_{12}$–$C_{15}$ primary straight-chain alcohols condensed with from 6–12 moles of ethylene oxide, or with 7–9 moles of a mixture of ethylene and propylene oxide, $C_{11}$–$C_{15}$ secondary alcohols condensed with from 3–15 moles of ethylene oxide, and $C_{10}$–$C_{18}$ fatty acid diethanolamides. Tertiary amine oxides such as higher alkyl di(lower alkyl or lower substituted alkyl)amine oxides, for example, lauryl di(hydroxymethyl)amine oxide, are also suitable. Further examples may be found in N Schick's textbook "Nonionic Surfactants", M Dekker Inc, New York, 1967. Mixtures of various nonionic surfactants may also be used.

For optimum detergency, the shorter alkyl chain length nonionic surfactants are preferred, particularly when the degree of alkoxylation is relatively low. Thus, the alkoxylated $C_9$–$C_{11}$ alcohols are preferred over the corresponding alkoxylated $C_{12}$–$C_{15}$ alcohols, and the $C_9$–$C_{11}$ alcohols condensed with 5 moles of ethylene oxide are preferred over the same alcohols but condensed with 8 moles of ethylene oxide.

A class of nonionic surfactants that give good streak-free results is comprised by the condensation products of $C_{16}$–$C_{20}$ alcohols with 15 to 20 moles of ethylene oxide. The condensation product of tallow alcohol with 18 moles of ethylene oxide is especially effective.

Anionic surfactants may also be present, but since these generally tend to foam more than nonionic surfactants they are generally used in smaller amounts, preferably in concentrations not exceeding 0.15% by weight; foaming is disadvantageous because foam can leave spots as it dries. Preferred anionic surfactants are the alkyl ether sulphates, especially the sulphated condensation products of $C_{10}$–$C_{18}$ aliphatic alcohols with 1 to 8 moles of ethylene oxide. Secondary alkane sulphonates, alkylbenzene sulphonates, soaps, dialkyl sulphosuccinates, primary and secondary alkyl sulphates, and many other anionic surfactants known to the man skilled in the art, are also possible ingredients.

It will further be recalled that the liquid composition for streak-free cleaning dries, after application to a surface, substantially without the formation of discrete droplets or particles larger than 0.25 µm, and preferably without the formation of such droplets or particles larger than 0.1 µm. It is the formation of such particles or droplets, which scatter visible light, which produces streaks on the surface. Avoidance of streak formation on drying may be assisted by including in the liquid composition a film-forming component, preferably but not exclusively an organic film-forming polymer.

The film-forming polymer in the liquid composition is advantageously an at least partially esterified resin, which can be either partly derived from natural sources or wholly synthetic in origin. An example of a resin partly derived from natural sources is the partially esterified adduct of rosin and an unsaturated dicarboxylic acid or anhydride. Examples of wholly synthetic resins are partially esterified derivatives of copolymerisation products of mono-unsaturated aliphatic, cycloaliphatic or aromatic monomers having no carboxy groups, copolymerised with unsaturated dicarboxylic acids or anhydrides thereof. Normally, these copolymers will contain equimolar proportions of the monomer and the dicarboxylic acid or anhydride, but copolymers with higher ratios of monomer per mole of dicarboxylic acid or anhydride are also suitable, provided that they can be dissolved in the aqueous solvent system used. Typical examples of suitable copolymers are copolymers of ethylene, styrene, and vinylmethylether with maleic acid, fumaric acid, itaconic acid, citraconic acid, aconitic acid and the like and the anhydrides thereof Preferred are the styrene/maleic anhydride copolymers.

The partly natural or wholly synthetic resins are at least partially esterified with a suitable hydroxyl-group-containing compound. Examples of suitable compounds are aliphatic alcohols such as methanol, ethanol, propanol, isopropanol, butanol, isobutanol, ethylhexanol and decanol, glycol ethers such as the butyl ether of ethylene glycol and polyols such as ethyleneglycol, glycerol, erythritol, mannitol, sorbitol, polyethylene glycol, polypropylene glycol; and the hydroxylic nonionic surfactants mentioned above. The choice of suitable esterification agent and the degree of esterification are primarily governed by the solubility requirements of the at least partially esterified resin in an aqueous or aqueous/solvent system of the type previously described, which will generally be alkaline.

In the at least partially esterified resin, the degree of esterification is preferably such that from 5 to 95%, more preferably from 10 to 80%, and especially 20 to 75%, of the free carboxy groups of the resin are esterified with the hydroxyl-group-containing compound. The esterification may also be complete.

Suitable examples of preferred partially esterified resins are partially esterified copolymers of styrene with maleic anhydride, for example, Scripset (Trade Mark) 550 (ex Monsanto, USA); partially esterified adducts of rosin with maleic anhydride for example, SR 91 (ex Schenectady Chemicals, USA); modified polyester resins, for example, Shanco (Trade Mark) 334 (ex Shanco Plastics); and polyvinyl methylether/maleic anhydride copolymers partially esterified with butanol, for example, Gantrez (Trade Mark) ES 425 (ex GAF Corporation, United States of America).

Mixtures of various partially esterified resins may also be used, as well as mixtures of partially esterified and fully esterified or non-esterified resins. Thus, mixtures of Scripset 550 and SR 91, Scripset 550 and Shanco 334, and SR 91 and Shanco 334 give good results, as well as mixtures of Scripset 550 and SMA 2000A (a non-esterified styrene/maleic anhydride copolymer ex Arco Chemical Co, United States of America).

The molecular weight of the resins used may vary from about a few thousand to about a few million. The partially esterified resins should have acid numbers high enough to ensure solubility in a neutral or alkaline aqueous medium. The partially esterified resin may if necessary be hydrolysed and subsequently neutralised or made alkaline so that in normal use it is present in the streak-free cleaning composition as the alkali metal, ammonium or substituted ammonium salt, or as the salt of a suitable amine or mixtures thereof.

The concentration of the film-forming resin in the streak-free cleaning composition is preferably within the range of from 0.001 to 5% by weight, more preferably from 0.005 to 1% by weight. At the higher levels the resin alone may be sufficient to lower the surface tension of the composition below the limiting value of 45 $mNm^{-1}$.

It is preferred, however, to use both a surface-active agent, preferably nonionic or nonionic plus anionic, and a film-forming resin. In this case the weight ratio of surfactant to resin preferably lies within the range of from 15:1 to 1:2, more preferably 10:1 to 1:1.

The streak-free liquid composition contains water, generally in substantial amounts. In most preferred systems it contains at least 80% water, and preferably at least 90%. In systems containing no non-aqueous solvent the water content is preferably at least 95% and may be as much as 99% or more. It is generally preferred to use demineralised water in order to minimise the possibility of streak-forming impurities; where calcium-sensitive active ingredients such as certain anionic surfactants (notably soaps and alkylbenzene sulphonates) are present this is especially important. Accordingly it will not generally be necessary to include a builder in the liquid composition, although the presence of most soluble builders does not, apparently, cause streak formation. On the other hand, with some active ingredients, streak-free drying is actually promoted by the hardness impurities in water. Certain nonionic surfactants, for example, when used alone in demineralised water give streaking because on drying a mist of droplets is formed. When hard water is used instead of demineralised water, however, streak-free drying can be achieved.

In addition to the various components already specified, the liquid composition for steak-free cleaning may if desired contain further, optional ingredients, such as preservatives, colouring agents, perfumes and plasticisers, with, of course, the proviso that such materials do not interfere with the streak-free drying properties of the composition.

According to another preferred embodiment of the second aspect of the invention, the liquid contained in the polymer is a bleach, especially an oxygen bleach and more especially a hydrogen-peroxide-based bleaching composition.

The invention will now be described in further detail, by way of example only, with reference to the accompanying drawings, in which.

Figure 1:
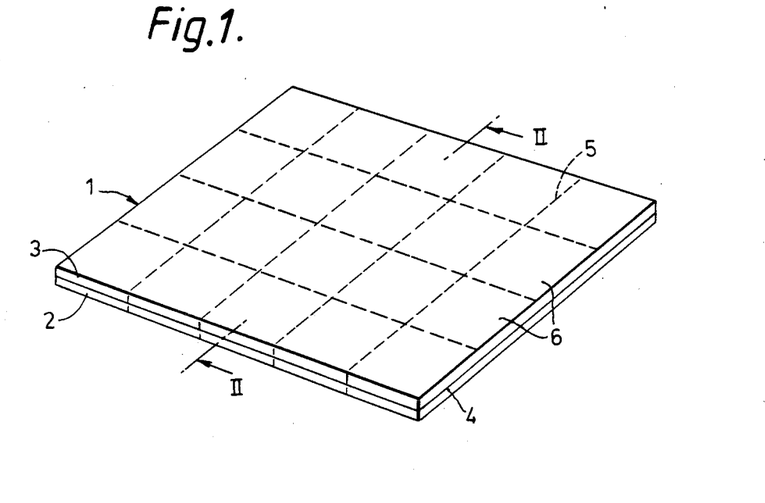
FIG. 1 is an isometric view of a first article according to the invention.
Figure 2:
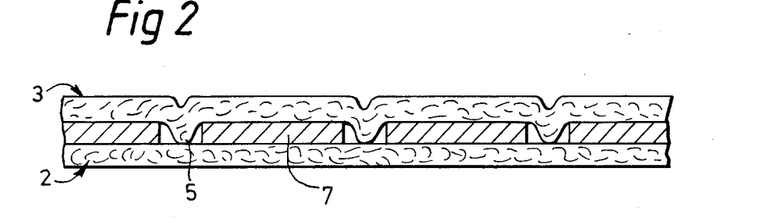
FIG. 2 is a fragmentary section along the line II—II of FIG. 1.

Referring now to FIGS. 1 and 2 of the drawings, a first article 1 consists of a lower substrate 2 and an upper substrate 3, each consisting of a single layer of nonwoven fabric or wet-strength paper. The two substrates are heat-sealed together along the edge regions 4 and also in a grid pattern 5, indicated in FIG. 1 by dotted lines, to form a plurality of compartments 6, each approximately 1.3×1.3 cm, each containing a 1 cm×1 cm square 7 of porous polymeric material, which may be dry or may carry a liquid. For clarity the thickness of the article 1 in comparison to its surface area have been greatly exaggerated.

Figure 3:
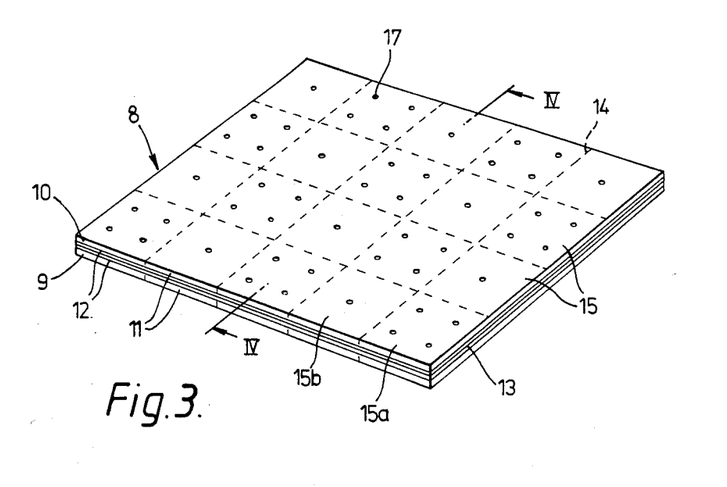
FIG. 3 is an isometric view of a second article according to the invention.
Figure 4:
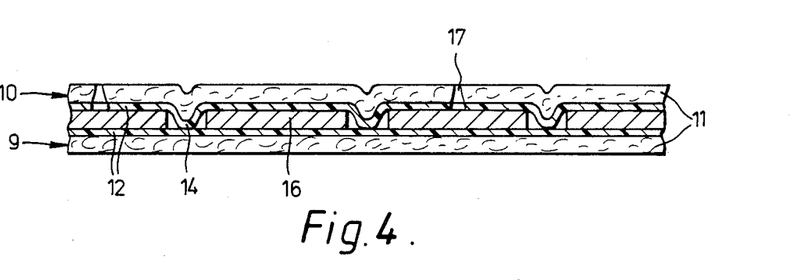
FIG. 4 is a fragmentary section along the line IV—IV of FIG. 3.

Referring now to FIGS. 3 and 4 of the drawings, a second article 8 consists of a lower substrate 9 and an upper substrate 10, each consisting of a layer 11 of nonwoven fabric or wet-strength paper and, laminated thereto on one side only, a thin film 12 of polyethylene. The substrates 9 and 10 are so positioned with respect to one another that the polyethylene-coated sides 12 are in contact. The polyethylene layers 12 of the two substrates are heat-sealed together along the edge regions 13 and also in a grid pattern 14, indicated in FIG. 3 by dotted lines, to form a plurality of compartments 15, each approximately 1.3×1.3 cm, each containing a 1 cm×1 cm square 16 of porous polymeric material carrying liquid. Perforations 17 are provided in the upper layer 10, the numbers of perforations in each compartment varying, so that, for example, the compartment 15a will release its contents considerably more rapidly than compartment 15b when the article is subjected to hand pressure. For clarity the size of the perforations 17, as well as the thickness of the article 1 in comparison to its surface area, have been greatly exaggerated.

The invention is further illustrated by the following non-limiting Examples.

EXAMPLES 1 TO 32—PREPARATION OF POROUS POLYMERS

Example 1

10 ml of styrene, 0.5 ml commercial divinylbenzene containing 0.25 ml ethyl vinyl benzene, and 2 g emulsifier (Sorbitan monoleate "Span" (Trade Mark) 80) were mixed together in a plastic beaker at 15° C. A protective film was placed over the beaker after the stirrer was positioned to reduce the evaporation of the monomers. The stirrer speed was adjusted to about 300 rpm, 0.7 gm of potassium persulphate was dissolved in 350 ml of distilled water and the resulting solution was then added into the beaker drop by drop until the total 350 ml of the solution had been added. In this way a thick creamy white stable emulsion was obtained and this emulsion was polymerised in a sealed plastic container at 50° C. for three days. The resulting water-filled polymer had a water content of 96.6% by weight, yet it felt only slightly damp to the touch and water could be expelled only by pressing or squeezing. It was cut into small blocks and was dried under a dry atmosphere at 25°–30° C. The dried polymer had a semiflexible structure and interconnected voids. Its dry density was 0.037 g/cc and its pore volume was 27 cc/g.

A sample of this polymer was placed in oleic acid and was found to absorb at least 30 times its own weight of the acid in about 10 minutes; also when the polymer was placed in a mixture of oleic acid and water it absorbed effectively only the oleic acid.

Example 2

10 ml styrene, 0.25 ml divinylbenzene, and 2 g "Span" (Trade Mark) 80 were mixed together at 25° C. in a plastic beaker. 300 ml of a 0.2% solution of potassium persulphate in distilled water were added to the monomer phase and polymerisation was carried out at 60° C. for 8 hours by exactly the same procedure as described in Example 1. The water-filled polymer had a water content of 96.2% by weight. A sample of the dried polymer, when placed in heavy grade liquid paraffin of density at 20° C., 0.870–0.890 and viscosity 178 cp at 25° C. it absorbed about 20 times its own weight of the paraffin. The polymer had a dry density of 0.044 g/cc and a pore volume of 22 cc/g.

Example 3

8.5 ml of styrene, 1.0 ml monooctyl itaconate, 0.5 ml divinylbenzene, 0.2 ml di-2-ethyl hexyl peroxydicarbonate (as an initiator) and 2 g of nonyl phenol/1.5 EO (Antarox (Trade Mark) C 0210) were mixed together at 15° C. 200 ml of distilled water was added into the monomer phase and polymerisation was carried out at 50° C. for 24 hours, following the same procedure as set out in Example 1. The water-filled polymer had a water content of 94.9% by weight. A sample of the dried polymer, when placed in oleic acid, absorbed about 15 times its own weight of oleic acid. The polymer had a dry density of 0.061 g/cc and a pore volume of 16 cc/g.

Example 4

5 ml of styrene, 5 ml of butyl methacrylate, 0.25 ml of allyl methacrylate (as a cross-linking agent) and 2 g of Span 80 were mixed together at 20° C. in a plastic beaker. 300 ml of 0.2% solution of potassium persulphate was added to the monomer phase and polymerisation was carried out by exactly the same procedure as described in Example 1. The dried polymer, when placed in perfume, absorbed about 50 times its own weight of perfume and subsequently released it very slowly. The dried polymer had a flexible structure.

Example 5

10 ml styrene, 1 ml divinylbenzene ( 50% ethyl vinylbenzene), 2 g Span 80 were mixed together. 450 ml of 0.2% solution of sodium persulphate in distilled water was added to the monomer phase and the resulting emulsion, which contained 97.8% internal phase, was polymerised in exactly the same way as described in Example 1. The polymer, when dried, absorbed about 40 times its own weight of oleic acid. After removing the soluble impurities by methanol, using a Soxhlet extractor, the polymer absorbed about 43 times its own weight of oleic acid. The dry density of the polymer after drying was 0.025 cc/g.

Example 6

Using the general procedure of Example 1, a polymer was prepared from the following ingredients:

| | |
|---|---|
| α-methyl styrene | 10 ml |
| divinyl benzene | 1 ml |
| Span (Trade Mark) 80 | 2 g |
| Water (containing 0.1% sodium persulphate) | 200 ml |

The resulting water-filled polymer had a water content greater than 90% by weight.

Example 7

Using the general procedure of Example 1, a polymer was prepared from the following ingredients:

| | |
|---|---|
| styrene | 5 ml |
| α-methyl styrene | 5 ml |
| divinyl benzene | 1 ml |
| Span (Trade Mark) 80 | 2 g |
| Water (containing 0.1% sodium persulphate) | 300 ml |

The resulting water-filled polymer had a water content greater than 95% by weight.

Example 8

Using the general procedure of Example 1, a polymer was prepared from the following ingredients:

| | |
|---|---|
| vinyl versatate (Trade Mark) (higher esters of vinyl acetate, ex Shell) | 10 ml |
| divinyl benzene | 1 ml |
| Span (Trade Mark) 80 | 2 g |
| Water (containing 0.1% sodium persulphate) | 200 ml |

The resulting water-filled polymer had a water content greater than 90% by weight.

Example 9

Using the general procedure of Example 1, a polymer was prepared from the following ingredients:

| | |
|---|---|
| styrene | 5 ml |
| vinyl versatate (Trade Mark) | 1 ml |
| divinyl benzene | 1 ml |
| Span (Trade Mark) 80 | 2 g |
| Water (containing 0.1% sodium persulphate) | 200 ml |

The resulting water-filled polymer had a water content greater than 90% by weight.

Example 10

Using the general procedure of Example 1, a polymer was prepared from the following ingredients:

| | |
|---|---|
| styrene | 5 ml |
| 2-ethylhexyl acrylate | 5 ml |
| divinyl benzene | 1 ml |
| Span (Trade Mark) 80 | 2 g |
| Water (containing 0.1% sodium persulphate) | 200 ml |

The resulting water-filled polymer had a water content greater tahn 90% by weight.

Examples 11 to 32

Using the general precedures set out in Example 1 work carried out using the mateirals set otu below and in Table III which gives data on Examples 11 to 32.

| Key to materials used in Examples 11–32 and set out in Table III | |
|---|---|
| Materials used in external phase | |
| A | styrene |
| B | butyl styrene |
| C | butyl methacrylate |
| D | ethyl methacrylate |
| E | approx. 50% divinylbenzene + 50% ethyl vinyl benzene |
| F | Allyl methacrylate |

-continued

| Key to materials used in Examples 11–32 and set out in Table III | |
|---|---|
| G | N—octadecyl succinic acid |
| H | Sorbitan mono-oleate (Span (Trade Mark) 80) |
| J | Bis-(2-hydroxyethyl)octadecylamine |

-continued

| Key to materials used in Examples 11–32 and set out in Table III | |
|---|---|
| S | 2,2-azobis-(2-amidenopropane)hydrochloride |

TABLE III

| Constituents | Ex. 11 | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|---|
| A (ml) | 10 | 10 | 10 | 10 | 5 | 5 | 5 | 10 | | 9 | 9 | 5 |
| B (ml) | | | | | | | | | 5 | | | |
| C (ml) | | | | | | | | | | 1 | | |
| D (ml) | | | | | | | | | | | 1 | |
| E (ml) | 1 | 1 | 1 | 1 | 0.5 | 0.5 | 0.5 | 1 | 0.5 | 1 | 1 | 5 |
| F (ml) | | | | | | | | | | | | |
| G (g) | | | | | | | 1 | | | | | |
| H (g) | 2 | 2 | 2 | 1 | | | | | 1 | 2 | 2 | 2 |
| J | | | | | | 1 | | | | | | |
| K | | | | | 1 | | | | | | | |
| L | | | | | | | | | 2 | | | |
| N (% on monomer) | | | | | | | | | | | | |
| O (ml) | 300 | 200 | 150 | 100 | 100 | 100 | 100 | 200 | 100 | 300 | 300 | 300 |
| P (ml) | | | | | | | | | | | | |
| Q (% internal phase) | 0.2 | 0.2 | 0.2 | 0.08 | 0.15 | 0.15 | 0.15 | 0.2 | 0.5 | 0.2 | 0.2 | 0.1 |
| R (% internal phase) | | | | | | | | | | | | |
| S (% internal phase) | | | | | | | | | | | | |
| Properties | | | | | | | | | | | | |
| % internal phase to monomers | 96.5 | 94.8 | 93.2 | 90.1 | 94.8 | 94.8 | 94.8 | 94.8 | 94.8 | 96.5 | 96.5 | 96.5 |
| Appox. oil uptake (w/w) | 23 | 12 | 10 | 8 | 12 | 13 | 13 | 12 | 15 | 24 | 24 | 20 |
| Approx. dry density | | | | | | | | | | | | |
| g/cm² | 0.04 | 0.065 | 0.082 | 0.099 | 0.06 | 0.06 | | | | | | |
| g/cm³ | | | | | | | 0.06 | 0.065 | *0.055 | 0.04 | 0.040 | 0.045 |

| Constituents | Ex. 23 | Ex. 24 | Ex. 25 | Ex. 26 | Ex. 27 | Ex. 28 | Ex. 29 | Ex. 30 | Ex. 31 | Ex. 32 |
|---|---|---|---|---|---|---|---|---|---|---|
| A (ml) | 1 | 8 | 10 | 10 | 10 | 10 | 15 | 15 | 15 | 15 |
| B (ml) | | | | | | | | | | |
| C (ml) | | 2 | | | | | | | | |
| D (ml) | | | | | | | | | | |
| E (ml) | 9 | | 1 | 1 | 1 | 1 | 1 | 1 | 1 | 1 |
| F (ml) | | 1 | | | | | | | | |
| G (g) | | | | | | | | | | |
| H (g) | 2 | 2 | 2 | 2 | 2 | 2 | | 2 | 3 | 4 |
| J | | | | | | | | | | |
| K | | | | | | | | | | |
| L | | | | | | | | | | |
| N (% or monomer) | | | 1 | | | | | | | |
| O (ml) | 300 | 200 | 200 | 200 | 240 | 100 | 200 | 200 | 200 | 200 |
| P (ml) | | | | | 60 | 100 | | | | |
| Q (% internal phase) | 0.1 | | | | 0.2 | 0.2 | 0.2 | 0.2 | 0.2 | 0.2 |
| R (% internal phase) | | 0.1 | | | | | | | | |
| S (% internal phase) | | | | 0.1 | | | | | | |
| Properties | | | | | | | | | | |
| % internal phase to monomers | 96.5 | 94.8 | 94.8 | 94.8 | 96.5 | 94.8 | 92.6 | 92.6 | 92.6 | 92.6 |
| Appox. oil uptake (w/w) | 20 | 13 | 12 | 12 | 24 | 13 | 9 | 12 | 11 | 10 |
| Approx. dry density | | | | | | | | | | |
| g/cm² | | | | | | | | | | |
| g/cm³ | 0.042 | 0.06 | 0.06 | 0.06 | *0.034 | *0.06 | 0.08 | 0.078 | 0.083 | 0.087 |

*Dry density after washing with methanol/water.

| K | Alkyl benzene sulphonic acid (Dob 102) and dimethyl hardened tallow amine oxide (Arromox (Trade Mark)DMHTD) |
| L | Partial fatty acid esters of polyglycerol (Admul (Trade Mark) Wol 1403) |
| N | benzyl peroxide |

Materials used in internal phase

| O | water |
| P | glycerol |
| Q | sodium persulphate |
| R | potassium persulphate |

EXAMPLE 33

Preparation of a Thin Film of Porous Polymeric Material

An emulsion was prepared as described in Eample 1 using 30 ml styrene (distilled), 3 ml divinylbenzene (distilled), 6 g of Span 80, and 900 ml distilled water conting 1.8 g sodium persulphate. The emulsion was prepared at a stirrer speed of 300 r.p.m. and left for a further 30 minutes at this speed before polymerisation was started.

The polymerisation was carried out in such a way as to yield thin sheets, 18 cm×18 cm×0.16 cm. Two glass plates were rendered superficially hydrophobic, and a 0.16 cm thick strip of neoprene rubber was stuck around the edge of one plate to define a square cavity 18 cm×18 cm. The cavity was filled with the emulsion, the second plate placed upon the first, and the two plates clipped together. The assembly was placed in a water bath at 50° C. for 24 hours. The polymerised material could then easily be removed as a sheet, which could readily be cut into 1 cm×1 cm squares using a scalpel and straight-edge.

Examples 34 & 35

Preparation of articles for absorbing hydrophobic liquids

EXAMPLE 34

A sheet of polymerised material as prepared in Example 33 was dried under a dry atmosphere at 25°–30° C. Its dry density was 0.037 g/cc and its pore volume was 27 cc/g.

The sheet was placed between two sheets of a polypropylene/viscose nonwoven fabric ("Novalene" (Trade Mark) US 15) and the sheets were heat-sealed together at their edges to form a sachet.

The article thus formed was used to mop up a pool of oleic acid. The amount of oleic acid absorbed was approximately 30 times the weight of the polymer.

Example 35

An article of the construction described above with reference to FIGS. 1 and 2 of the accompanying drawings was prepared as a product for mopping up hydrophobic liquids. The substrate layers each consisted of a polypropylene/viscose nonwoven fabric, and were sealed together at the edges and in a grid pattern by heatsealing. The size of the article was 30 cm×30 cm and the compartments were each 1.3 cm×1.3 cm. Each compartment contained 1 cm×1 cm square of a polymer prepared as in Example 33 and dried as in Example 34.

The article was used to mop up a pool of oleic acid, and the amount of oleic acid absorbed was approximately 30 times the weight of the polymer.

EXAMPLES 36–49—Preparation of porous polymer containing streak-free cleaning compositions

Example 36

A liquid composition was prepared as follows:

|  | % by wt |
|---|---|
| Nonionic surfactant: $C_{12}$–$C_{15}$ primary straight-chain alcohol, condensed with 7 moles of ethylene oxide | 10 |
| Partially esterified resin: partial ester of a styrene-maleic anhydride copolymer, neutralised to the sodium salt (average molecular weight 10000; theoretical acid number 190) | 2 |
| Demineralised water, perfume | to 100 |

This composition was then diluted 100-fold in demineralised water.

A polymer was prepared as described in Example 2 and dried under a dry atmosphere at 25°–30° C. The dried polymer was washed out several times with ethanol, using a Soxhlet extractor, and then dried again in a dry atmosphere at 25°–30° C. It was then filled under vacuum with the liquid composition given above. The liquid uptake was 96% by weight.

The resulting polymeric material containing a liquid cleaning composition was a solid block feeling only slightly damp to the touch. Liquid could be expelled only be pressing or squeezing.

Example 37

A streak-free cleaning composition was made up as follows:

|  | % |
|---|---|
| Nonionic surfactant: $C_9$–$C_{11}$ primary straight-chain alcohol condensed with 5 moles of ethylene oxide (Dobanol 91-5 ex Shell) | 0.095 |
| Partially esterified resin: partial ester of a styrene-maleic anhydride copolymer, neutralised to the sodium salt (average molecular weight 10 000; theoretical acid number 190). (Scripset 550 ex Monsanto) | 0.01 |
| Demineralised water | to 100 |

A thin polymer film was prepared as described in Example 33 and cut into 1 cm×1 cm squares using a scalpel and straight-edge. The squares were Soxhlet extracted with methanol for 6 hours, dried in an oven at 30° C., and evacuated in a suitable vessel for 30 minutes. The vessel was isolated, the pump turned off, and the streak-free composition given above was sucked in. This process was repeated after 15 minutes; it took about 1 hour for the squares of polymer to become filled.

The filled polymer squares, containing more than 95% liquid, felt only slightly damp to the touch, and liquid could be expelled only by pressing or squeezing.

Examples 38–49

The procedure of Example 37 was repeated with a number of different non-streak formulations, all in demineralised water, as follows:

| Example | Formulation |
|---|---|
| 38 | Nonionic surfactant as in Example 37 (0.095%), vinyl methyl ether/maleic anhydride copolymer partially esterified with butanol (Gantrez ES 425 ex GAF Corporation) (0.01%) |
| 39 | Tallow alcohol ($C_{18}$), 18 EO (0.1%) |
| 40 | $C_{13}$–$C_{15}$ oxo alcohol, 20 EO (Synperonic (Trade Mark) 20 ex ICI) (0.1%) |
| 41 | Nonyl phenol 18 EO (0.1%) |
| 42 | Nonyl phenol 30 EO (0.1%) |
| 43 | $C_{12}$–$C_{14}$ alkyl ether (3 EO) sulphate (Empicol (Trade Mark) ESB 70 ex Albright & Wilson) (0.1%) |
| 44 | $C_{10}$–$C_{12}$ linear alkylbenzene sulphonate (Dobs (Trade Mark) 102 ex Shell) (0.06%) |
| 45 | $C_{10}$–$C_{12}$ linear alkylbenzene sulphonate (0.12%) and $C_{12}$–$C_{15}$ alkyl ether sulphate (Dobanol (Trade Mark) 25 ex Shell) (0.03%) |
| 46 | Sodium di(2-ethylhexyl) sulphosuccinate (0.12%), $C_{11}$–$C_{15}$ secondary alcohol 12 EO (0.09%), ethanol (0.13%) |
| 47 | Tallow alcohol 18EO (0.1%) Isopropanol (10.0%) Ammonia (35% solution) to pH 10 |
| 48 | $C_{12}$–$C_{15}$ alkyl ether sulphate 3 EO (0.1%) $C_9$–$C_{11}$ linear primary alcohol 5 EO (0.03%) Partially esterified resin as in Example 37 (0.01%), Isopropanol (10.0%), Ammonia (35% solution) to pH 10 |
| 49 | Ammonium soap of 50% coconut/50% oleic acid |

| Example | Formulation |
|---|---|
| | (0.005%), partially esterified resin as in Example 37 (0.1%). |

In each case the filled polymer squares contained more than 95% liquid and felt only slightly damp to the touch, and liquid could be expelled only by pressing or squeezing.

EXAMPLES 50–64—Preparation of streak-free cleaning articles

Example 50

A thin polymer film, 7 cm×7 cm, was prepared as described in Example 33 and the water in the polymer was replaced by the streak-free cleaning composition of Example 37, using the method described in that Example.

The sheet of liquid-containing polymer was placed between two sheets, with 7.6 cm×7.6 cm, of a polypropylene/viscose nonwoven fabric ("Novalene" (Trade Mark) US 15), which had previously been washed in boiling demineralised water, rinsed in cold demineralised water and dried. The sheets were heat-sealed together at their edges to form a sachet.

The sachet was then used to wipe over a clean black glazed ceramic tile using the following procedure. The sachet was first positioned over the tile surface and pressed against the surface with the fingers to express a suitable quantity of liquid onto the surface. The sachet was then used to spread the liquid over the surface. The tile was allowed to dry naturally and its surface was shining and streak-free.

Example 51

A thin polymer film containing a streak-free cleaning composition was prepared as in Example 50 and was placed between two sheets, each 7.6 cm×7.6 cm, of a laminated substrate consisting of a base layer of nonwoven fabric ("Storalene" (Trade Mark) 610:60, consisting of 40% cotton linters, 55% viscose and 5% polyamide) with a thin layer of polyethylene extrusion-coated thereon. The nonwoven fabric had previously been washed as described in Example 50 to remove streak-forming impurities. The two sheets were positioned with their polyethylene layers adjacent to one another and were heat-sealed together at the edges to form a sachet. Using a syringe needle of diameter 0.8 mm a number of perforations were made in the upper wall of the sachet.

The sachet was used to wipe over a clean black glazed ceramic tile as described in Example 50, the liquid being expressed through the perforations on to the tile surface. The tile was left shining and streak-free after natural drying.

Example 52

An article of the construction described above with reference to FIGS. 1 and 2 of the accompanying drawings was prepared for use as a non-streak cleaning product. The substrate layers each consisted of a polypropylene/viscose nonwoven fabric ("Novalene" (Trade Mark) US 15) which had been prewashed in boiling demineralised water. The size of the article was 30 cm×30 cm and the compartments were each 1.3 cm×1.3 cm. Each compartment contained a 1 cm×1 cm square of the liquid-containing polymer prepared in Example 37.

The article was used, as described in Example 50, to wipe a clean black glazed ceramic tile. The surface of the tile was left shining and streak-free after natural drying.

Example 53

An article of the construction described above with reference to FIGS. 3 and 4 of the accompanying drawings was prepared for use as a non-streak cleaning product. The substrate layers each consisted of a nonwoven fabric (Tampella (Trade Mark) K286 blue, a wet-laid nonwoven fabric consisting of 80% viscose and 20% woodpulp, base weight 50 g/m$^2$) extrusion-coated with a 20–30 μm layer of polyethylene, (Alkathene (Trade Mark) 7 ex ICI), and prewashed in boiling demineralised water. The size of the article was 30 cm by 30 cm, and the compartments were each 1.3 cm×1.3 cm. Each compartment contained a 1 cm×1 cm square of the liquid-containing polymer prepared in Example 37. The substrates were perforated at 2 to 4 holes/cm$^2$.

The article was used, as described in Example 50, to wipe a clean black glazed ceramic tile. The surface of the tile was left shining and streak-free after natural drying. 60% of the liquid contained in the polymer could readily be expelled from the article by hand pressure, the remainder being retained in the polymer and substrate.

Examples 54–65

Example 53 was repeated using the polymer squares prepared in Examples 38–49 and similar results were obtained about 60% of the liquid was delivered in each case and streak-free results were obtained in the black tile test.

Example 66

Preparation of an Article for Bleaching Stains on Textile Fabrics

A polymer was prepared as in Example 1, using the following materials:

| | |
|---|---|
| Styrene | 10 ml |
| Divinyl benzene | 1 ml |
| Span 80 | 28 g |
| water (25% hydrogen peroxide, 0.2% potassium persulphate) | 300 ml |

A piece of the resulting hydrogen-peroxide-containing polymer was incorporated in a sachet as described in Example 34. The sachet was used as a stain remover on textile fabrics.

We claim:

1. An article suitable for delivering liquid, said article comprising a flexible liquid-permeable substrate carrying a pressure-sensitive porous polymeric material capable of retaining at least 5 times its own weight, defined in terms of water, of liquid and of releasing at least some of said liquid on the application thereto of hand pressure, the porous polymeric material containing an aqueous or non-aqueous liquid.

2. The article of claim 1, wherein the porous polymeric material is capable of retaining at least 10 times its own weight of liquid, defined in terms of water.

3. The article of claim 1, wherein the porous polymeric material is capable of retaining at least 25 times its own weight of liquid, defined in terms of water.

4. The article of claim 1, wherein the porous polymeric material has a dry density of less than 0.1 g/cc.

5. The article of claim 1, wherein the porous polymeric material comprises linked pores having a pore volume of more than 9 cc/g.

6. The article of claim 1, wherein the porous polymeric material is the polymerisation product of a high internal phase emulsion having an aqueous internal phase which constitutes at least 90% by weight of the emulsion.

7. The article of claim 1, wherein the porous polymeric material is selected from the group consisting of vinyl polymers.

8. The article of claim 7, wherein the porous polymeric material is a styrene polymer.

9. The article of claim 1, wherein the substrate comprises one or more layers of paper and/or nonwoven fabric.

10. The article of claim 1, wherein the porous polymeric material is enclosed within a sachet, at least one wall of said sachet being permeable to liquid.

11. The article of claim 1, which comprises a first substrate layer and a second substrate layer so bonded together so to create a plurality of compartments therebetween, at least some of said components containing said porous polymeric material and being permeable to liquid.

12. The article of claim 1, wherein the porous polymeric material contains a homogeneous aqueous liquid composition having a surface tension of less than 45 mNm$^{-1}$, which composition, when applied to a surface and allowed to dry, dries substantially without forming discrete droplets or particles larger than 0.25 μm.

13. The article of claim 1, wherein the porous polymeric material contains an aqueous liquid comprising a surface-active agent.

14. The article of claim 1, wherein the porous polymeric material contains an aqueous liquid comprising a partially esterified resin.

15. An article suitable for deliveirng or absorbing a liquid, said article comprising a flexible liquid-permeable substrate surrounding a pressure-sensitive porous polymeric material capable of retaining at least 10 times its own weight, defined in terms of water, of liquid and of releasing at least some of said liquid on the applicaiton thereto of hand pressure, the porous polymeric material being dry or containing an aqueous or non-aqueous liquid.

16. An article suitable for delivering or absorbing a liquid, said article comprising a flexible liquid-permeable substrate surrounding a pressure-sensitive porous polymeric material which is the polymerization product of a high internal phase emulsion having an aqueous internal phase, the porous polymeric material being capable of retaining at least 5 times it own weight, defined in terms of water, of liquid and releasing at least some of said liquid on the application thereto of hand pressure, the porous polymeric material being dry or containing an aqueous or non-aqueous liquid.

17. An article suitable for delivering a cleaning liquid, said article comprising a flexible liquid permeable substrate surrounding a pressure-sensitive porous polymeric material capable of retaining at least 5 times its own weight, defined in terms of water, of liquid and of releasing at least some of said liquid on the application thereto of hand pressure, the porous polymeric material containing an aqueous or non-aqueous cleaning liquid.

* * * * *